Jan. 24, 1933.  F. W. ZELCER  1,894,970
GEAR SHIFTING MECHANISM
Filed Sept. 22, 1931  14 Sheets-Sheet 1
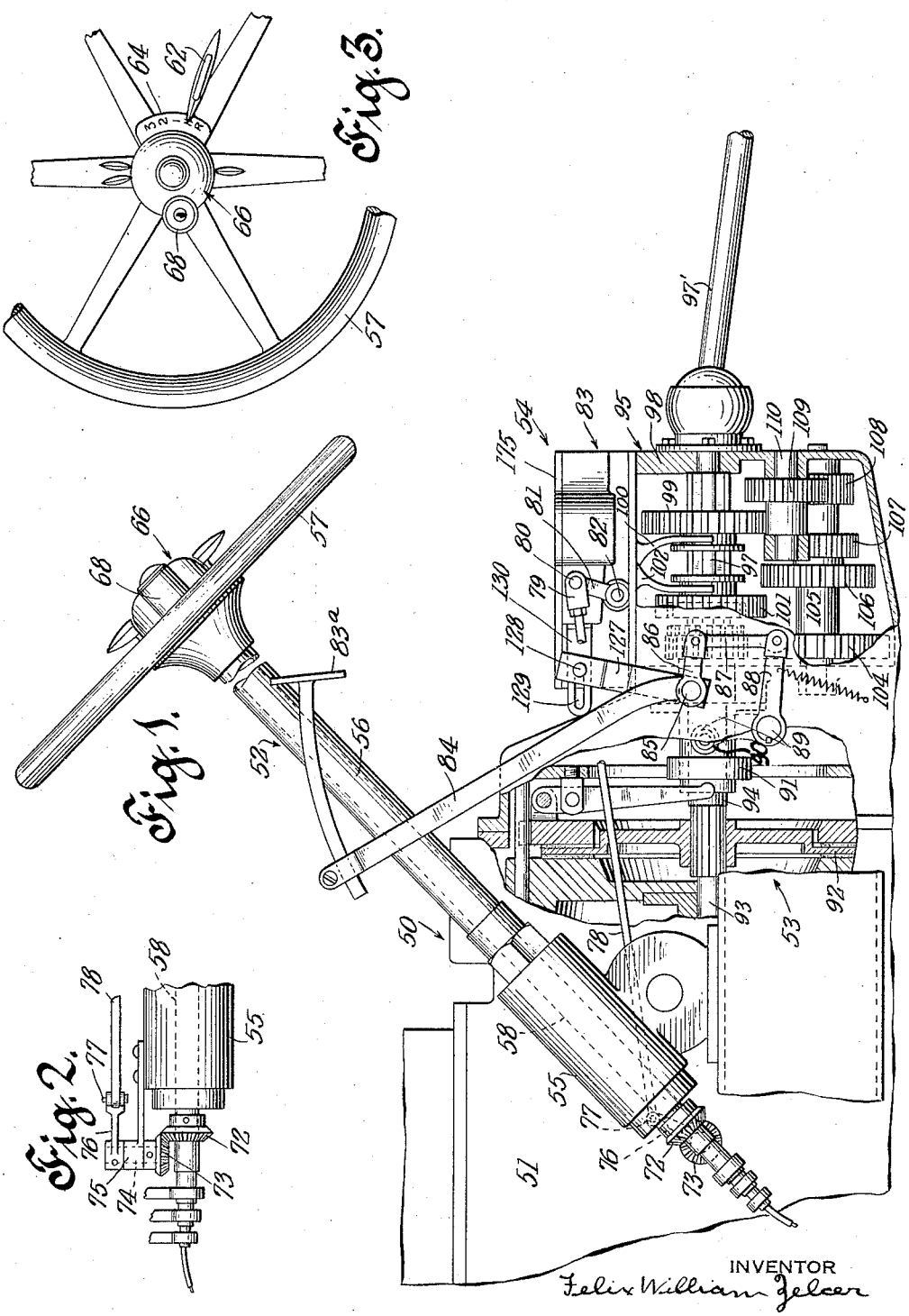
INVENTOR
Felix William Zelcer

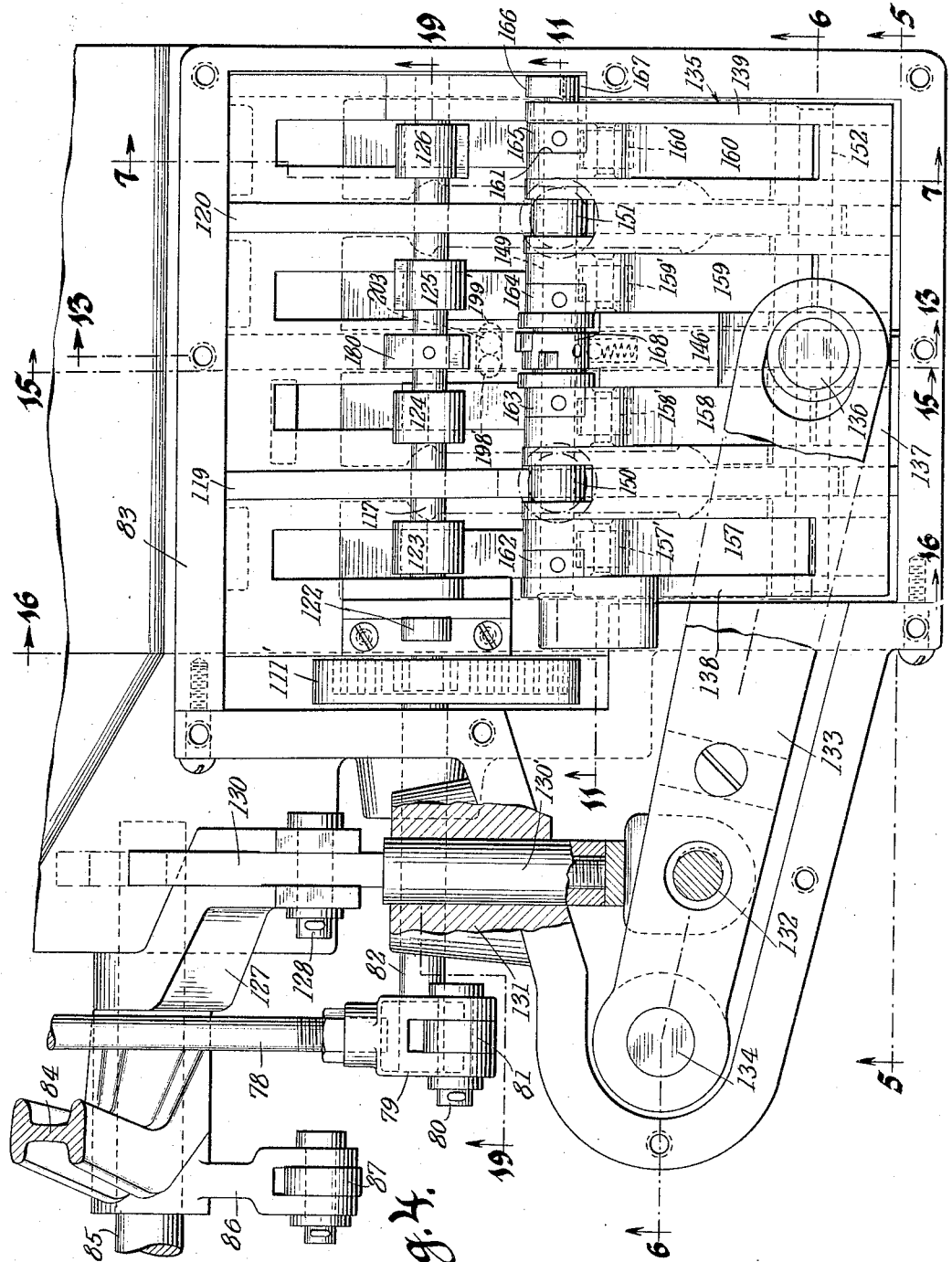

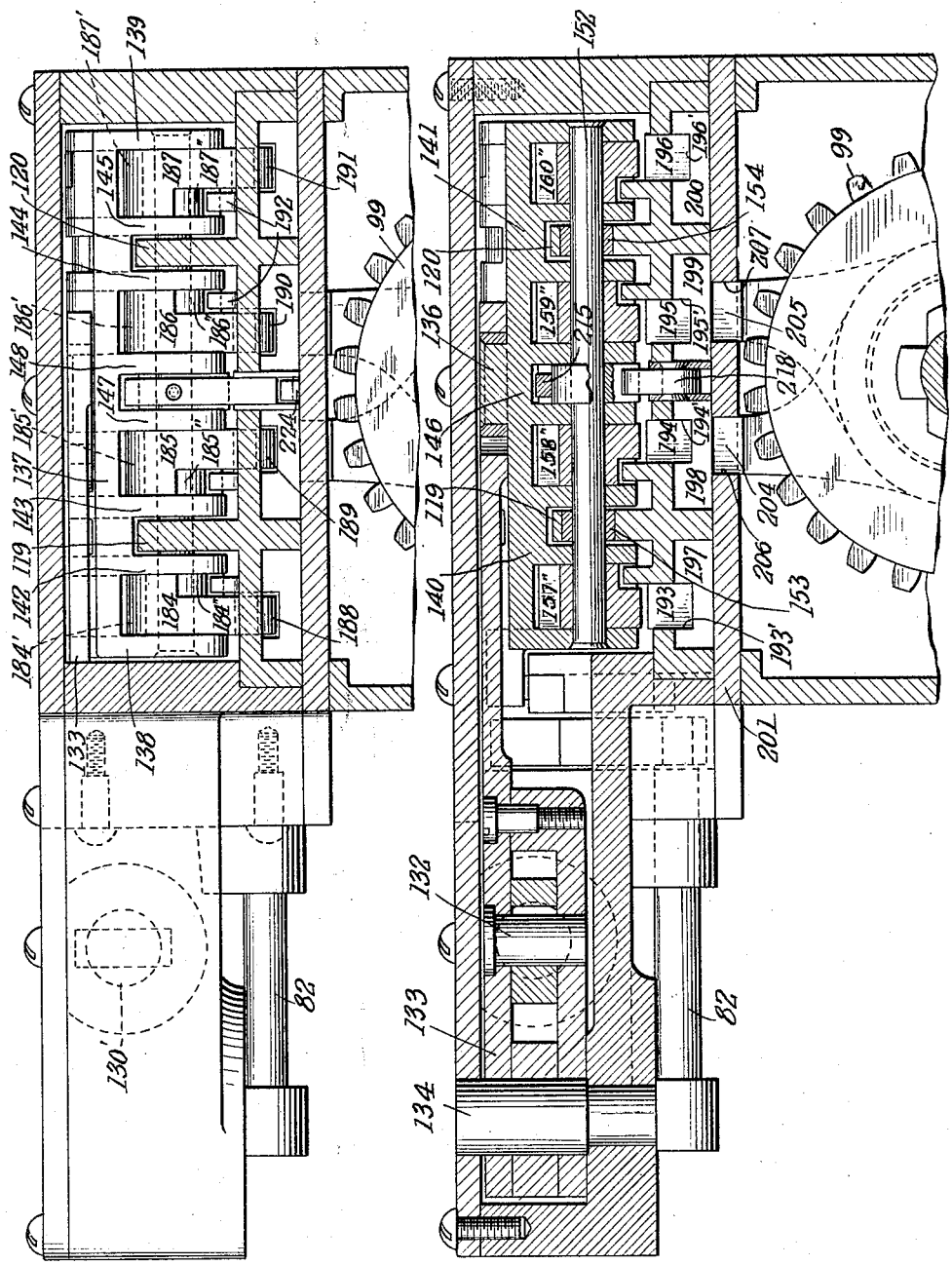

Jan. 24, 1933.   F. W. ZELCER   1,894,970
GEAR SHIFTING MECHANISM
Filed Sept. 22, 1931   14 Sheets-Sheet 4
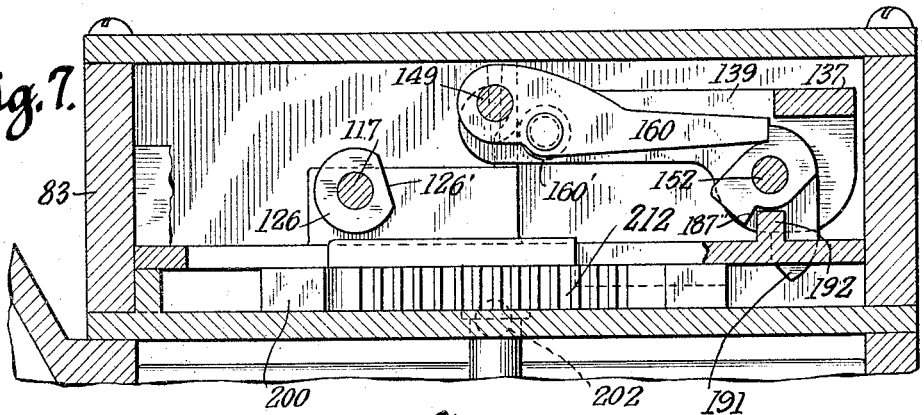
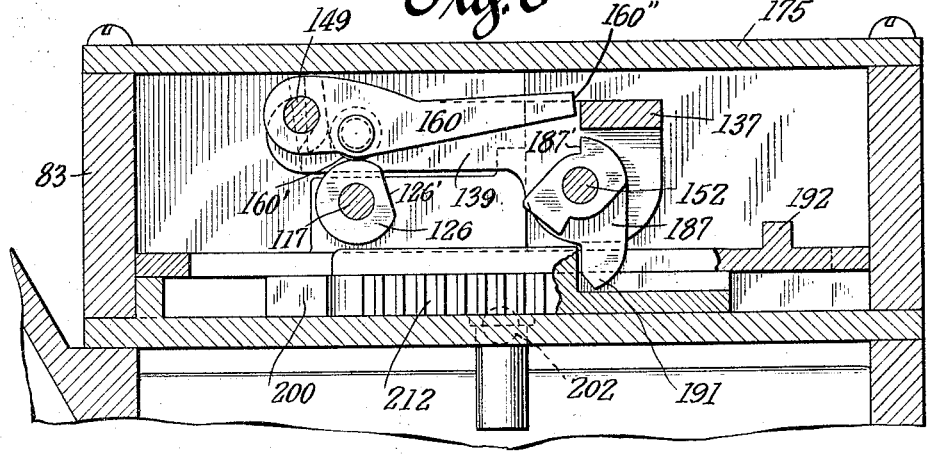
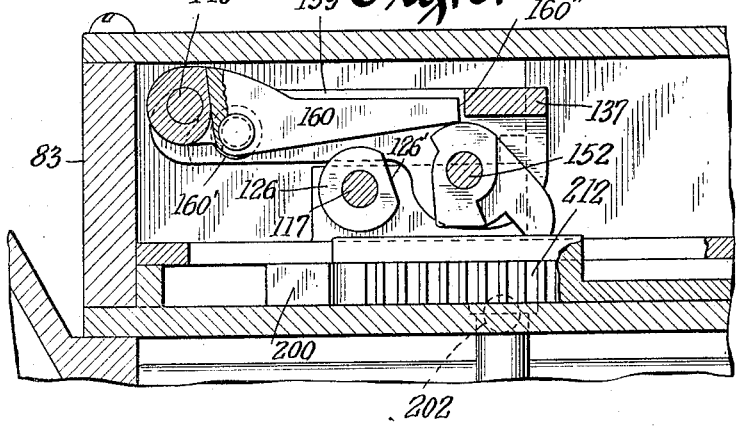
INVENTOR
Felix William Zelcer

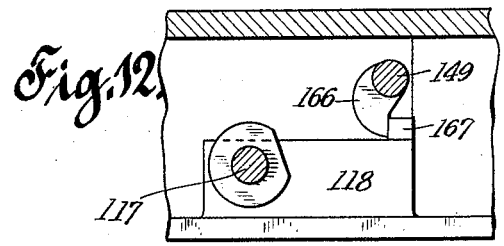
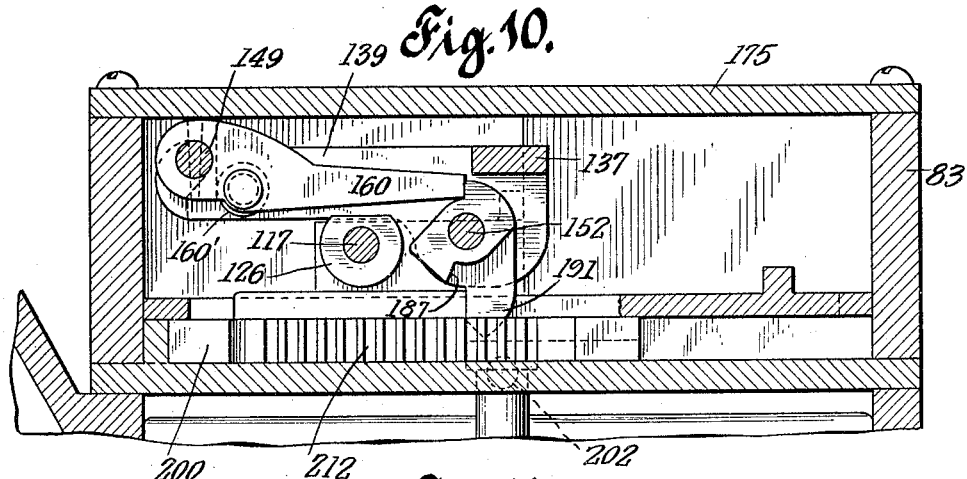
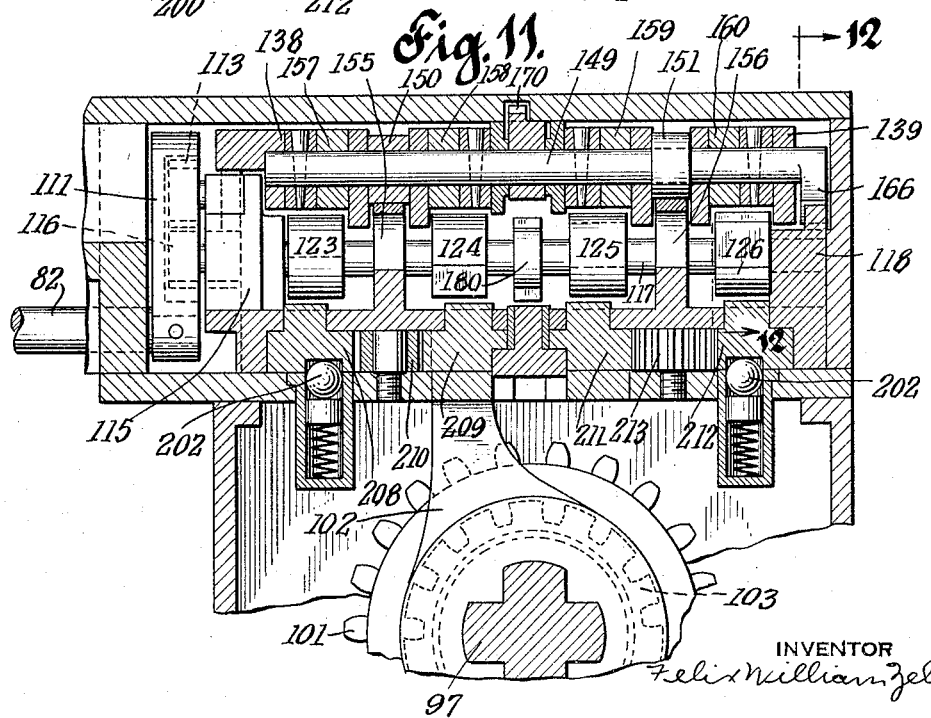

Jan. 24, 1933.  F. W. ZELCER  1,894,970
GEAR SHIFTING MECHANISM
Filed Sept. 22, 1931  14 Sheets-Sheet 6
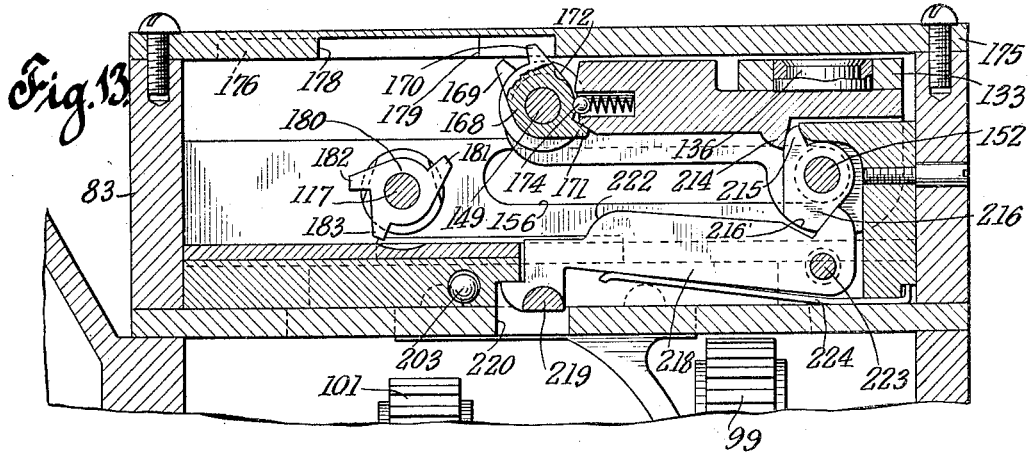
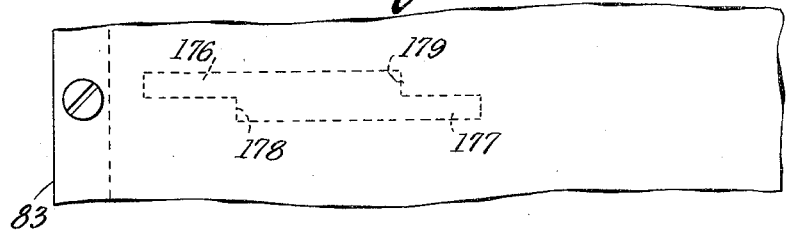
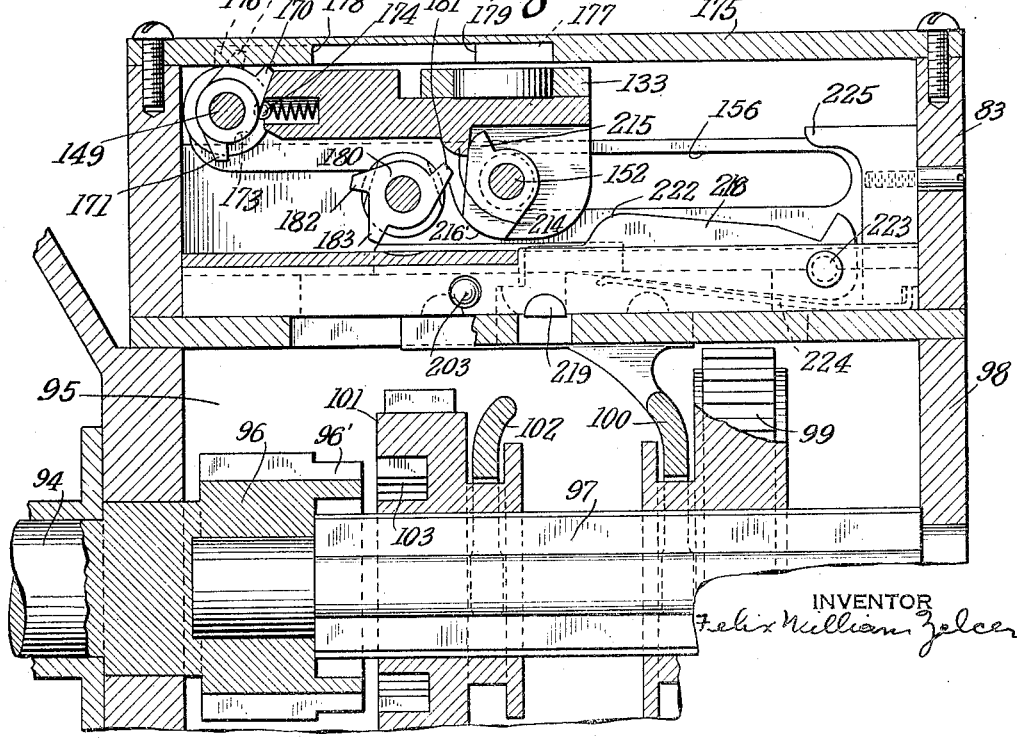
INVENTOR
Felix William Zelcer

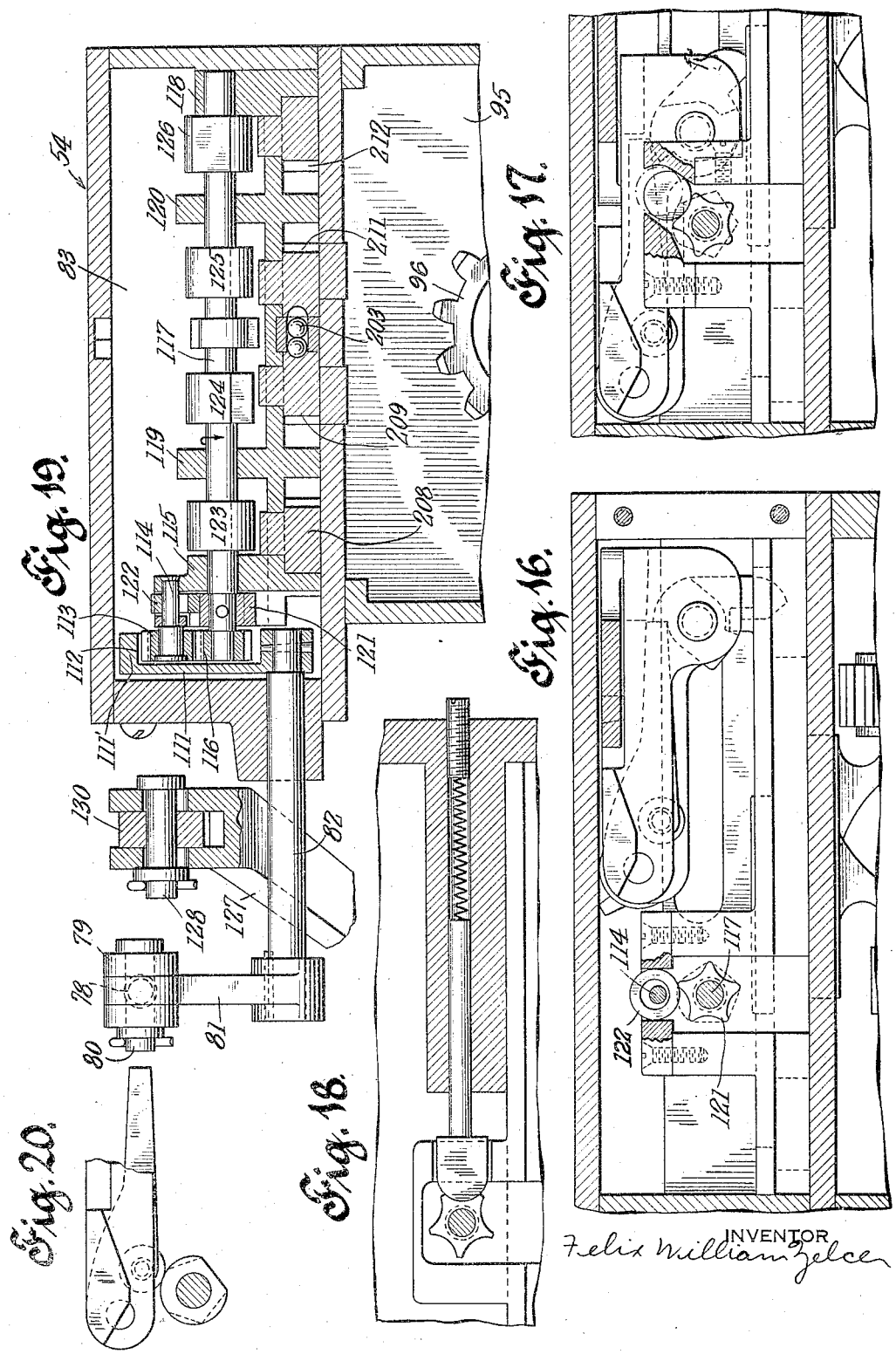

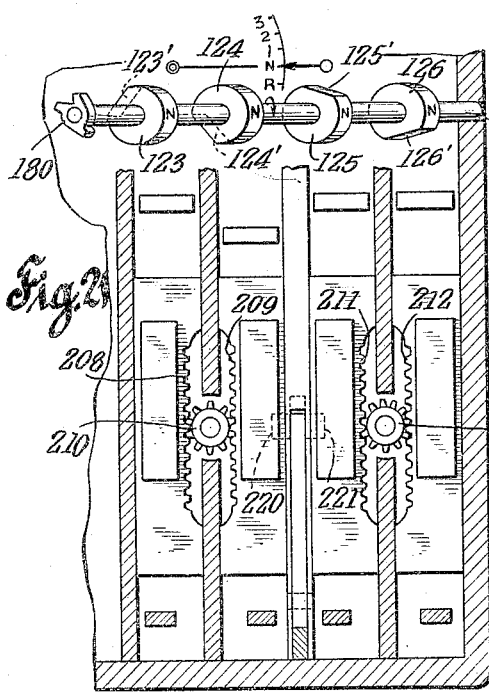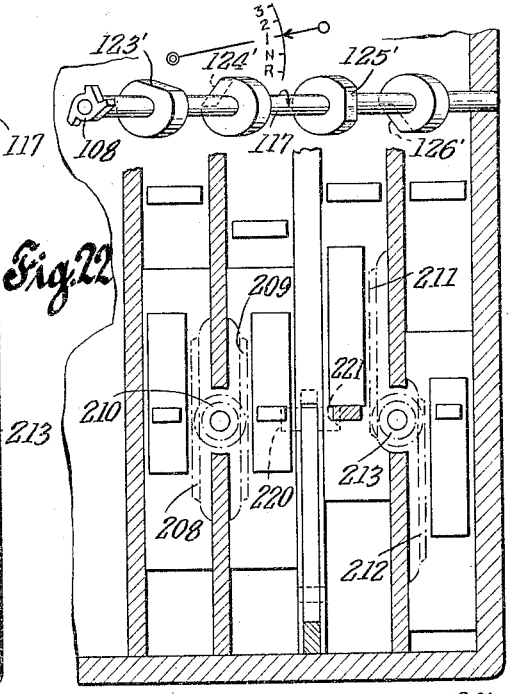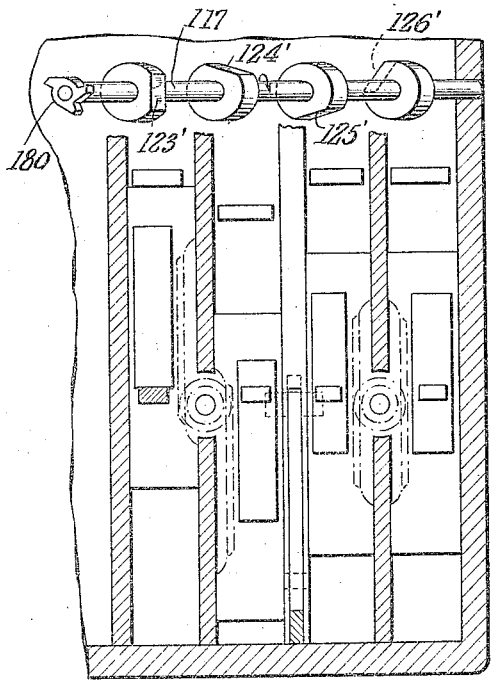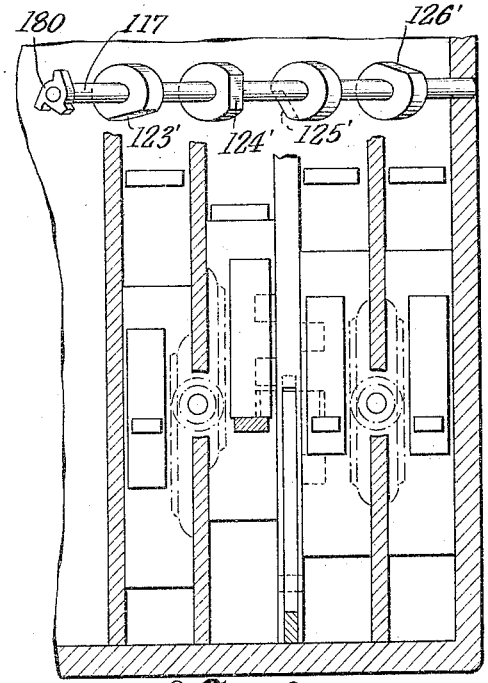

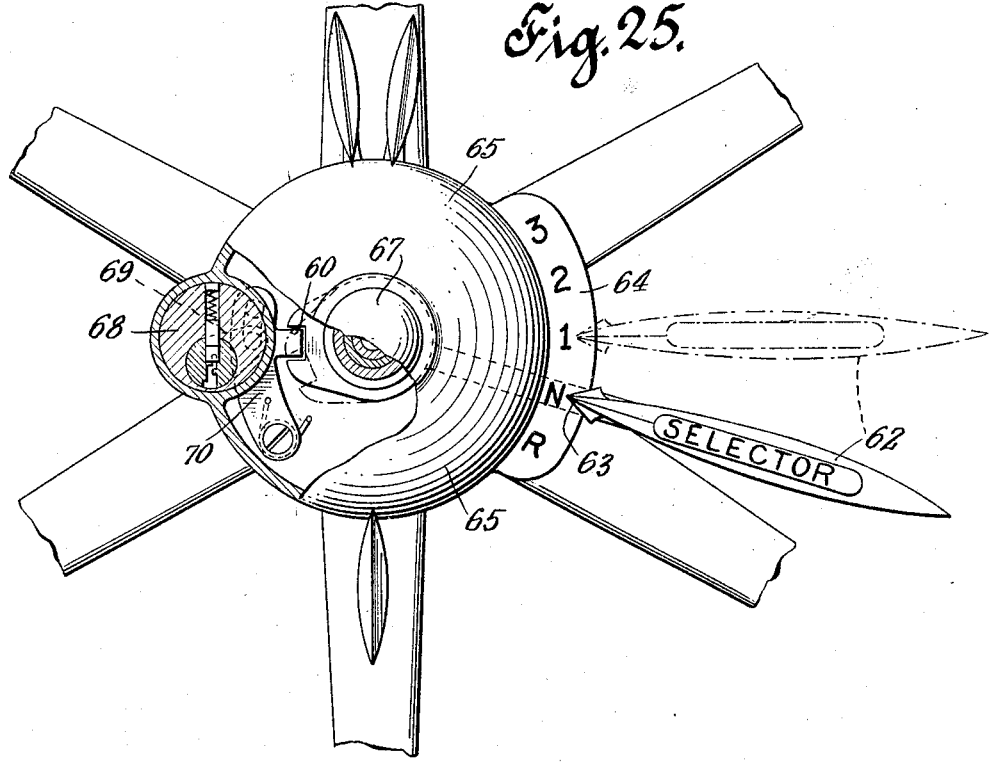
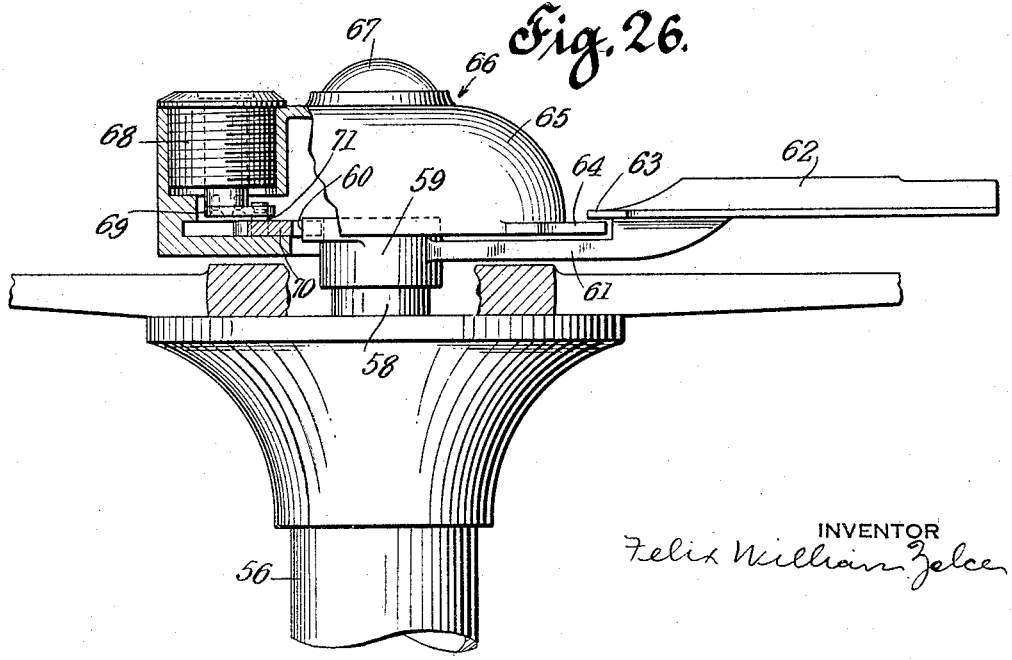

Jan. 24, 1933. F. W. ZELCER 1,894,970
GEAR SHIFTING MECHANISM
Filed Sept. 22, 1931 14 Sheets-Sheet 10
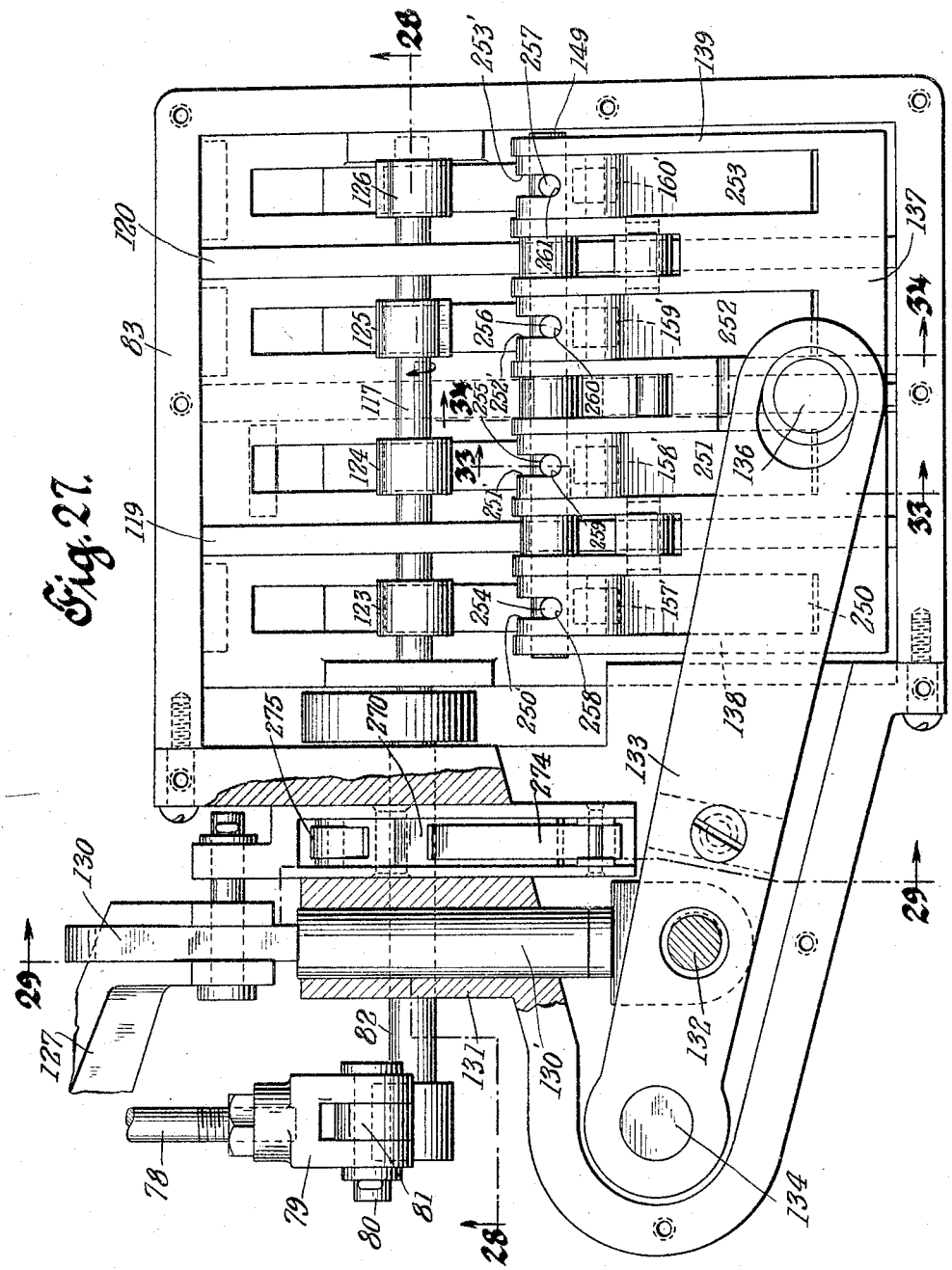
INVENTOR
Felix William Zelcer

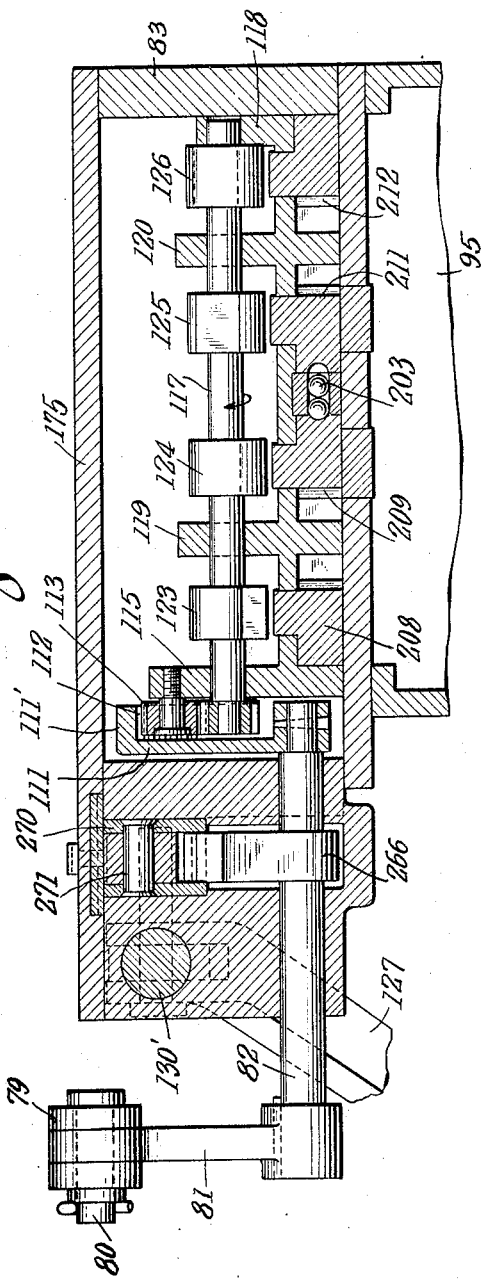

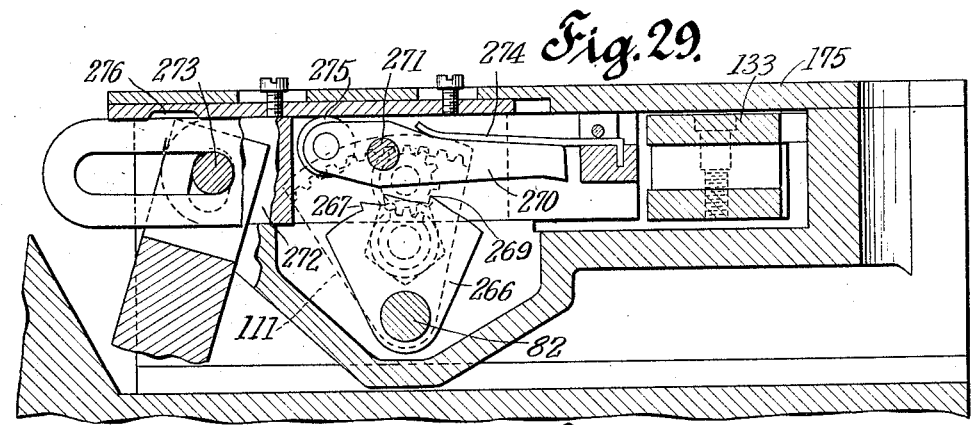
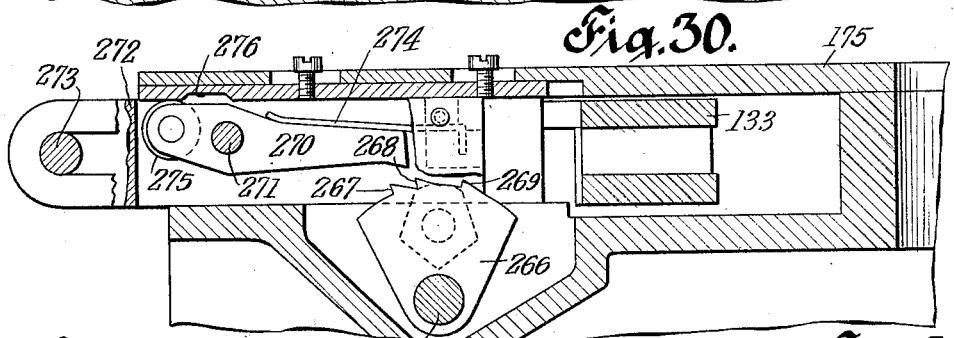
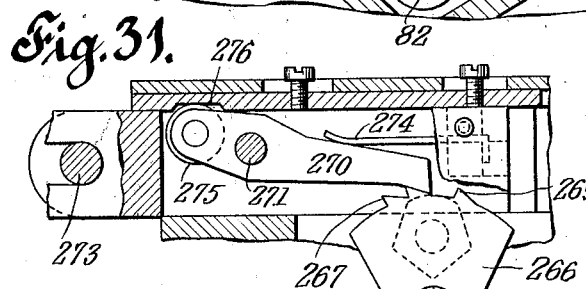
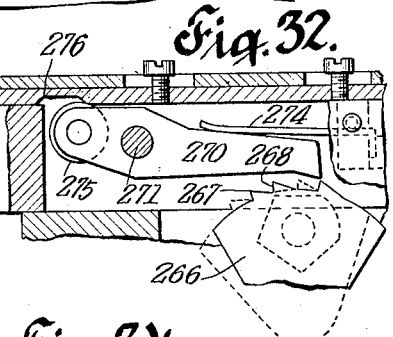
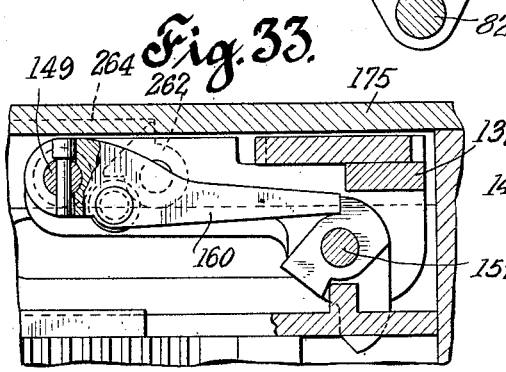
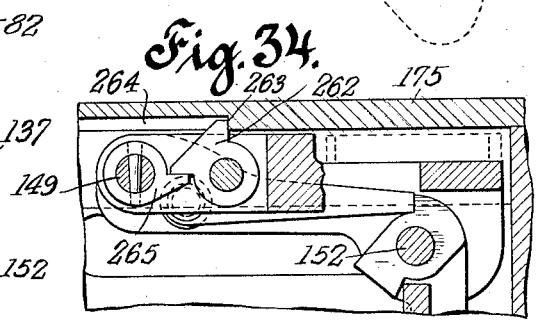

Jan. 24, 1933. F. W. ZELCER 1,894,970
GEAR SHIFTING MECHANISM
Filed Sept. 22, 1931 14 Sheets-Sheet 13
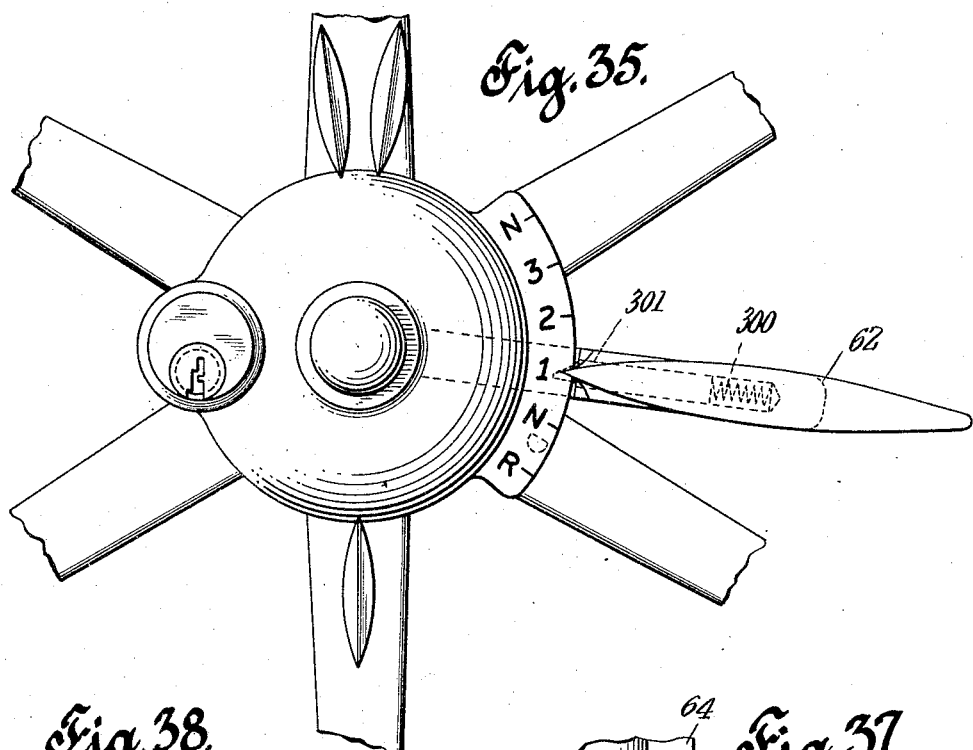
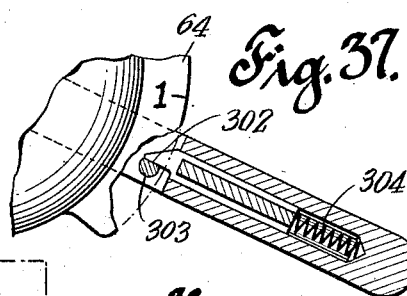
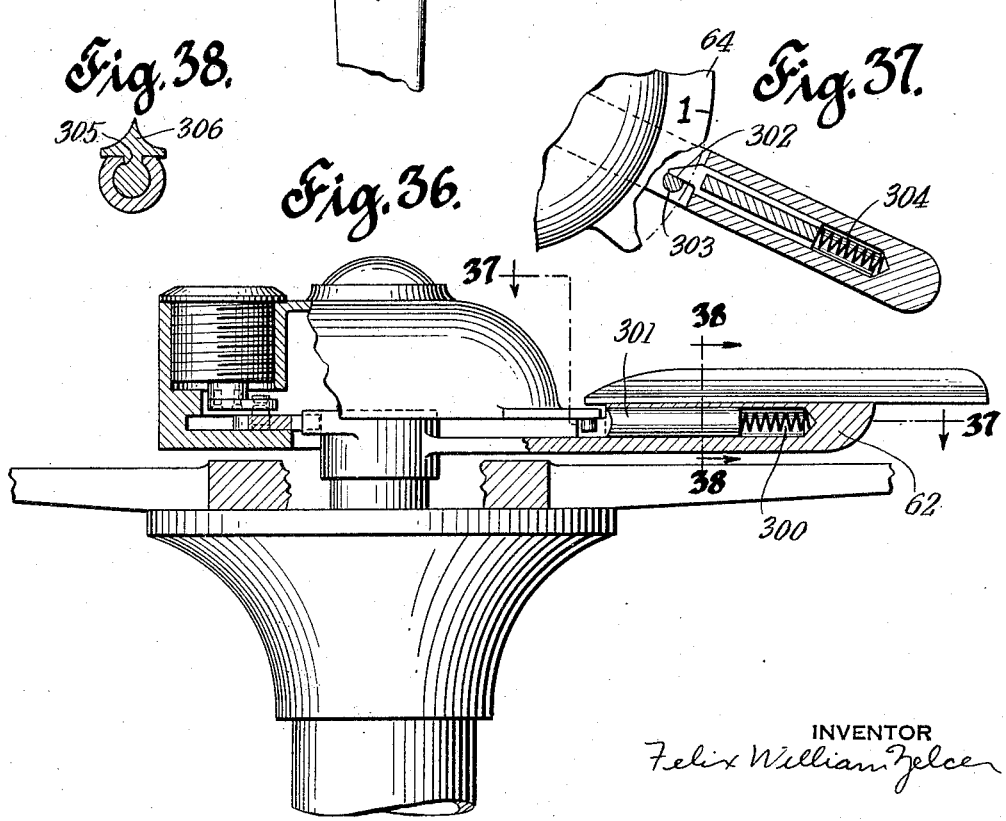
INVENTOR
Felix William Zelcer

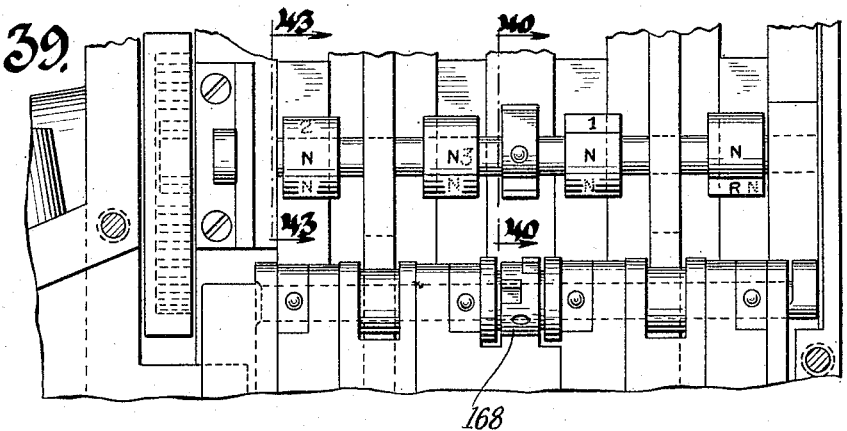
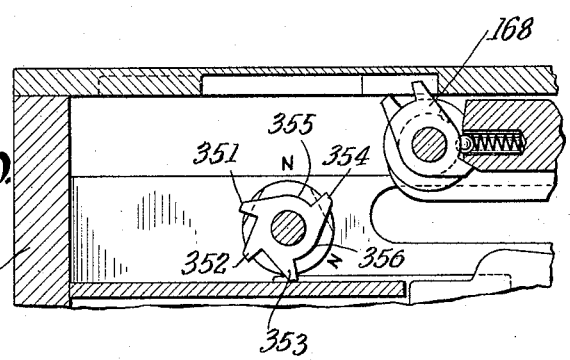
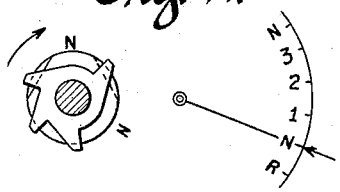  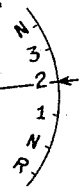
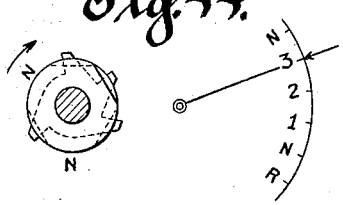 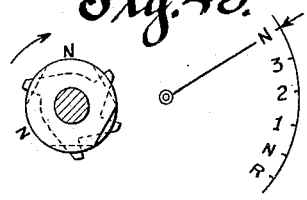 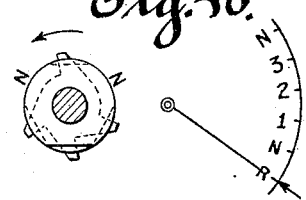

Patented Jan. 24, 1933

1,894,970

UNITED STATES PATENT OFFICE

FELIX WILLIAM ZELCER, OF NEW YORK, N. Y.

GEAR SHIFTING MECHANISM

Application filed September 22, 1931. Serial No. 564,376.

My present invention relates to gear shifting mechanism and aims to devise apparatus of the general character specified which are easy and economical to fabricate and assemble, which are easily and readily operated in a manner relieving the strain of driving motor vehicles and which overcome certain disadvantages associated with such mechanisms as exist at present.

Before describing my invention in detail, I deem it advisable to briefly refer to the disadvantages of the prior art, so that the manner in which the present invention overcomes the same will be more readily understood.

Hitherto, in operating the transmission of a motor vehicle, it was necessary, while the gears were in a neutral position, to "throw out" the clutch and operate the shift lever to move the gears into first speed. Thereafter, the clutch was "let in" to connect the motor shaft, through the transmission with the rear of the car, and thus drive the rear wheels. After overcoming the inertia, the clutch was again "thrown out" and the shift lever operated to move the gears out of first speed, through neutral and into second speed. Thereafter, the clutch was once more "let in" and the connection between the motor, through the transmission, and rear, completed. As soon as the vehicle had gained momentum, the clutch was again "thrown out" and the shift lever operated to move the gears out of second speed, through neutral and into third or high speed. Upon finally "re-engaging" the clutch, the vehicle was moving in high speed under normal conditions.

Such a procedure has certain disadvantages. For one thing, the shift lever cannot be operated unless the driver releases one of his hands from the steering apparatus that guides the course of the vehicle. Obviously, driving with the remaining one hand on the steering wheel is dangerous, especially during the shifting from second to third speeds, for at that time the vehicle is already moving at a fair rate of speed, for example, at about ten to thirteen miles per hour. In addition, shifting gears as done with existing transmissions, is tiresome and constitutes a strain upon the driver, particularly when driving in heavy traffic.

The present invention overcomes these disadvantages, and affords certain advantages, which will be obvious to those skilled in the art to which this invention relates, as the description progresses, by providing for the automatic operation of the transmission by and simultaneously with the functioning of the clutch mechanism. In other words, the present invention enables automatic, progressive shifting. This may be explained more clearly as follows:

By means of the present invention, the depression of the clutch pedal, not only causes the clutch to disconnect the motor from the transmission, but also causes the transmission gears to automatically engage for a particular speed. In other words, the first-time that the clutch is "thrown out," the selector mechanism of the present invention having been set for first speed, the transmission gears automatically move into first speed so that when the clutch is "let in" the vehicle starts to travel in that speed. After overcoming the inertia, the clutch is again "thrown out." This causes not only the disconnection between the motor and transmission, but also moves the gears, which are in first speed, "out of speed," and moves the gears automatically into second speed. Re-engagement of the clutch therefore finds the vehicle traveling in second speed. Similarly, "throwing out" and "letting in" the clutch again automatically moves the transmission gears out of second speed and into third speed so that the car will be traveling under normal high speed conditions.

The advantages of such an arrangement are obvious and will not therefore be discussed in further detail at this point.

In the following specification, I shall describe, and in the annexed drawings show a few illustrative embodiments of the gear-shifting mechanism of the present invention. However, it is to be clearly understood that I do not wish to be limited to the exact details described or shown inasmuch as changes may be made within the spirit and scope of the claims hereto appended and forming a part of this specification.

In the accompanying drawings, Fig. 1 is a partial side-elevational, partial longitudinal sectional view of the steering, clutch and transmission mechanisms of a motor vehicle equipped with the gear shifting apparatus of the present invention;

Fig. 2 is a top plan view of the connection between the selector-mechanism-operating device, and the selector mechanism;

Fig. 3 is a fragmentary top plan view of a conventional steering wheel equipped with the selector-mechanism-operating device of the present invention;

Fig. 4 is a top plan view of the head of the transmission casing containing the selector mechanism of the present invention, the cover thereof being removed to show the internal construction;

Fig. 5 is a partial rear elevational, partial transverse sectional view taken on line 5—5 of Fig. 4;

Fig. 6 is a transverse sectional view taken on line 6—6 of Fig. 4;

Fig. 7 is a longitudinal sectional view taken on line 7—7 of Fig. 4, and showing the starting position of the speed-selecting frame in an inoperative condition;

Fig. 8 is a similar view of the same in its intermediate position;

Fig. 9 is a similar fragmentary view of the same in its final position;

Fig. 10 is a similar view of the same in its final position in an operative condition;

Fig. 11 is a transverse sectional view taken on line 11—11 of Fig. 4;

Fig. 12 is a fragmentary longitudinal sectional view taken on line 12—12 of Fig. 11;

Fig. 13 is a longitudinal sectional view taken on line 13—13 of Fig. 4;

Fig. 14 is a top plan view of a part of the cover of the head of the transmission casing;

Fig. 15 is a longitudinal sectional view taken on line 15—15 of Fig. 4 and showing the mechanism in its final position in an inoperative or neutral condition;

Fig. 16 is a longitudinal sectional view taken on line 16—16 of Fig. 4;

Fig. 17 is a similar, fragmentary view of the same showing a modified means for preventing the selector cams from sliding;

Fig. 18 is a like view showing still another modification;

Fig. 19 is a transverse sectional view taken on line 19—19 of Fig. 4;

Fig. 20 is a similar fragmentary view showing a speed-selector link and cam in their final positions in a neutral condition;

Fig. 21 is a diagrammatic view showing the position of the selector mechanism in neutral;

Fig. 22 is a similar view of the same in first speed;

Fig. 23 is a like view of the same in second speed;

Fig. 24 is a similar view of the same in third speed;

Fig. 25 is a fragmentary, partial top plan, partial transverse sectional view of the manually-operated selector;

Fig. 26 is a similar, partial side elevational, partial longitudinal sectional view of the same;

Fig. 27 is a view similar to Fig. 4, but showing a modification thereof;

Fig. 28 is a transverse sectional view taken on line 28—28 of Fig. 27;

Fig. 29 is a longitudinal sectional view taken on line 29—29 of Fig. 27 and showing a modified form of automatic selector mechanism for progressive shifting;

Fig. 30 is a similar view of the same in its forward position in a neutral condition;

Fig. 31 is a fragmentary like view of the same intermediate its return to a normal position;

Fig. 32 is a similar view of the same just prior to the termination of its return movement;

Fig. 33 is a like view taken on line 33—33 of Fig. 27;

Fig. 34 is a similar view taken on line 34—34 of Fig. 27;

Fig. 35 is a fragmentary, top plan view of a modified form of manually operated selector;

Fig. 36 is a partial side elevational, partial longitudinal sectional view of the same;

Fig. 37 is a longitudinal sectional view taken on line 37—37 of Fig. 36;

Fig. 38 is a transverse sectional view taken on line 38—38 of Fig. 36;

Fig. 39 is a view similar to Fig. 4 of still another modification;

Fig. 40 is a longitudinal sectional view taken on line 40—40 of Fig. 39;

Fig. 41 is a diagrammatic view of the automatic selector of the modification shown in Fig. 39 in a neutral position;

Fig. 42 is a similar view of the same in first speed;

Fig. 43 is a like view of the same in second speed;

Fig. 44 is a similar view of the same in third speed;

Fig. 45 is a similar view of the same in a neutral position intermediate third speed and reverse; and Fig. 46 is a like view of the same in reverse speed.

Referring now more in detail to the preferred form of the aforesaid illustrative embodiments of the gear shifting-mechanisms of the present invention, and with particular reference to Figs. 1 to 26 inclusive, of the drawings depicting the same, the numeral 50 generally designates that portion of a motor vehicle as includes the motor housing 51, steering apparatus 52, clutch housing 53 and transmission mechanism 54.

The manual selector mechanism of the present invention is preferably associated with the steering apparatus, although not necessarily so, and while various forms thereof may be utilized, I prefer to employ manual selector mechanism substantially as follows:

The steering apparatus 52 includes a bearing 55 located beneath the floor board of the vehicle, in which there is journalled a steering column 56, having secured to the upper end thereof in a position convenient to the driver of the vehicle, a steering wheel 57. The steering column 56 is hollow and is adapted to house a rotatable shaft 58, the upper end of which extends beyond the steering column, and carries a keeper member 59, provided with a depression 60, in the periphery thereof. Formed with the member 59 and extending radially outwardly therefrom, is an arm 61 to which is fixed an operating lever 62 bearing the legend "Selector," this lever being adapted to be manually operated for the selection of speeds as will hereinafter be described. The indicating, inner end 63 of the lever 62, is adapted to pass over a sector 64 having arcuately arranged on the face thereof the letters and numerals "R," "N," "1," "2" and "3," corresponding respectively to reverse, neutral, first speed, second speed, and third speed. The sector may be in the form of a flange integral with the cap member 65 of a conventional warning signal 66, having the operating button 67, carried on the steering apparatus. If desired, there may also be combined in the cap 65, a lug 68, the operating member 69 of which may engage a latch member 70 through a pin and arcuate slot 71, to cause the latter to cooperate with the depression 60 of the keeper member 59. Thus, by operating the lug 68 while the selector lever 62 is set in a neutral position, the transmission may be locked and the vehicle rendered inoperative. This will more clearly appear when the description is further progressed.

Fixed upon the lower end of the shaft 58 is a bevel gear 72, meshing with a mating gear 73 fixedly mounted upon a stub shaft 74, journalled in a bearing 75, carried by the steering column bearing 55 and secured upon the end of the shaft, opposite to that which carries the bevel gear 73, is a link 76 pivoted at 77 to connecting rod 78, the opposite end of which is provided with a clevis 79 pivoted at 80 to another link 81 fixed upon a shaft 82, journalled in the upper portion 83 of the transmission casing 54. The operation of the selector lever 62 causes the rotation of the shaft 82 for a purpose which will later be described. Before describing the selector mechanism any further, I deem it advisable to set forth the description of the operating mechanism up to an equivalent point, so that the two mechanisms may be followed together thereafter. While various constructions for the operating mechanism may be utilized, I prefer to employ the mechanism herein described and shown in the annexed drawings which is as follows:

The numeral 83a designates a clutch pedal carried by a clutch lever 84 fixed on a pivot 85 journalled in the clutch housing 53. The pivot 85 also carries a link 86 pivotally connected by a rod 87, to a bell-crank lever 88, keyed upon another pivot 89, likewise journalled in the housing 53. The latter lever carries rollers 90 adapted to cooperate with and move a collar 91 which operates, in a well-known manner the clutch plates 92 as clearly shown in Fig. 1 of the drawings; to connect or disconnect the motor shaft 93 and the intermediate shaft section 94.

The shaft section 94 passes rearwardly into the lower portion 95 of the transmission casing 54 and has fixed on the rear end thereof a pinion 96, the central portion of which constitutes a bearing for one end of a spline shaft 97, the opposite end of which is journalled in a bearing 98 formed in the lower casing portion 95, where it connects with the driving shaft 97' connecting with the differential at the rear of the vehicle. Slidable on the spline shaft 97 is a large gear 99 with which there is associated a fork 100. Also slidable on the spline shaft 97 is a slightly smaller gear 101, one face of which is associated with a fork 102 and the other face of which is provided with keyways 103 adapted to cooperate, as will be described shortly, with keys 96' formed on the facing surface of the pinion 96. The pinion 96 is, at all times, in mesh with a large gear 104 fixed upon an idler shaft 105, journalled in the lower casing portion 95 beneath the spline shaft 97. Fixed upon the idler shaft 105 is a gear 106 similar in size to the gear 101, and adjacent this gear is another similar gear 107. Finally, there is fixed on the idler shaft 105 intermediate the gear 107 and the wall of the lower casing portion 95, another gear 108 meshed with a mating gear 109 secured upon a stub shaft 110 journalled in the lower casing portion 95.

Thus, by moving the large driven gear 99 into mesh with the small driving gear 107, the drive shaft is driven at a reduced speed corresponding to low or first speed. When the gear 101 is moved into mesh with the gear 106 of similar size, the drive shaft is driven at an intermediate or second speed. When the gear 101 is moved into engagement with the gear 96 through the keyways 103 and keys 96', the drive shaft 97' is in direct connection with the motor shaft 93 and is driven at third, or high speed. And finally, when the large driving gear 99 is moved into mesh with the smaller intermediate gear 109 which in turn is in mesh with the driving gear 108, the driving shaft 97' is driven in a reverse direction, at a low speed.

I shall now return to the description of the selector mechanism, the manual control of which I described in earlier portions of this specification. The shaft 82 extends within the upper casing portion 83 and carries on the inner end thereof a flanged sector 111, the flange 111' of which is internally toothed at 112 to mesh with a pinion 113 carried on a stub shaft 114 rotatably supported in a guide block 115. The pinion 113 in turn meshes with another pinion 116, fixed on the end of a cam shaft 117, journalled at one end in the guide block 115. This shaft extends transversely across the upper casing portion 83, and is journalled at its other end in the second guide block 118, and additional guide blocks 119 and 120 which also act as bearings for the cam shaft 117. Also fixed upon the cam shaft 117, intermediate the guide block 115 and pinion 116, is a star wheel 121 with which there is associated an eccentric 122, carried by the shaft 114, the arrangement being such that when the cam shaft 117 is adjusted into a particular position, as will hereinafter be readily understood, it is positively held in that position and cannot accidentally be jarred out of the same. This arrangement is clearly shown in Figs. 16 and 19. While I prefer to use this type of stop device, I have shown modifications thereof in Figs. 17 and 18 which are self-explanatory and need no further elucidation at this time.

Carried by the cam shaft 117 are four cam disks 123, 124, 125 and 126, respectively, provided with flattened portions 123', 124', 125' and 126', each cam respectively corresponding to second speed, third speed, first speed and reverse. The cams are so arranged upon the shaft so that not more than one flattened portion is positioned upwardly at a time, and no two flattened portions are in the same plane. This completes the description of the manually operated selector mechanism. It will be noted that by operating the selector lever 62 the cams 123, 124, 125 and 126 are manipulated so that a predetermined one of such cams will have its flattened portion 123', 124', 125' or 126' facing upwardly for a purpose which will be described in subsequent portions of this specification.

I shall now return to the shifting cams described up to a certain point in earlier portions of this specification, and the operation of the present portions of which depends upon the original position of the selector mechanism, the description of which has just been completed.

Fixed upon the shaft 85, which carries the clutch lever 84, is a lever 127, the upper portion of which is offset and is pivotally connected at 128 through an elongated slot 129, with a flat bar 130, having a cylindrical portion 130', reciprocatable in a bearing 131 formed in the upper casing portion 83, the bar being pivoted at 132 to a frame operating lever 133 rotatably supported in the upper casing portion 83 at 134. The frame operating lever 133 is pivotally engaged at its inner end with a selector frame 135 as shown at 136. The selector frame 135 consists of a transverse bar 137 from which extends at the sides thereof, side plates 138 and 139, and from which also extend intermediate the side plates, fingers 140 and 141, provided with downturned portions 142, 143, 144 and 145. Finally, the transverse bar 137 is provided intermediate the fingers 140 and 141, with a central short finger 146 having the downturned plates 147 and 148.

Journalled in the plates 138, 142, 143, 144, 145 and 139, so as to extend across the selector frame 135, is a shaft 149, and rotatably mounted on this shaft intermediate the plates 142 and 143, and intermediate the plates 144 and 145, are rollers 150 and 151, adapted to respectively roll on the upper surfaces of the guide blocks 119 and 120, thus supporting and guiding the front end of the frame 135. Fixed in the plates 138, 142, 143, 147, 148, 144, 145 and 139, and also extending across the frame 135, is another shaft 152, and rotatably mounted on this shaft intermediate the plates 142 and 143 and intermediate the plates 144 and 145 are rollers 153 and 154, adapted to roll in elongated slots 155 and 156, respectively formed in the guide blocks 119 and 120, thus supporting and guiding the rear end of the frame 135.

It will therefore be noted that when the clutch pedal 83a is depressed, the first part of its movement causes the disengagement of the clutch and its continued movement causes the bar 130 to be pulled forwardly, thus moving the entire frame 135 in the same direction.

Pivotally mounted on the shaft 149 respectively intermediate the plates 138 and 142, 143 and 147, 148 and 144, and 145 and 139, are locking links 157, 158, 159 and 160, respectively adapted to be operated as will later be seen by the cams 123, 124, 125 and 126, and corresponding in the order mentioned, to second speed, third speed, first speed and reverse. The links are each provided with rollers 157', 158', 159' and 160', by means of which the links are operated by the cams 123, 124, 125 and 126. The links are cut away at 161 and fitting into the cutaway portions are collars 162, 163, 164, and 165, fixed upon the shaft 149, each having a flat surface coinciding with a similar surface on the corresponding links and a rounded surface immediately beneath the flat surface, the arrangement being such that if any one of the links is pivoted upwardly, it will bind with the corresponding collar, which, being fixed on the shaft, will rotate the latter in a counter-clock-wise direction, although the remaining links, being pivoted on the shaft, will remain unmoved, it being noted that counter-clock-wise rotation of the shaft will present the rounded portion of each remaining collar to the flat surfact of the corresponding link, so that no binding will occur. However, if any links are tilted upwardly and then the shaft is rotated in a clock-wise direction, the binding will be brought about between the collars and their corresponding links, so that the latter will be returned to their normal lowered position. This latter movement which will later be explained more in detail, is brought about by a pawl 166, fixed upon one end of the shaft 149, and adapted to engage a stop 167 formed on the upper surface of the guide block 118.

Intermediate the plates 147 and 148 of the central finger 146, there is revolubly carried on the shaft 149 a tripping member 168 having on its upper surface the offset lugs 169 and 170, and on its lower surface the depending lug 171. The periphery of this member is provided with two detents adapted to receive a spring-pressed ball 174, carried by the central finger 146. Thus the tripping member will be retained in one of its two adjustable positions as clearly shown in Figs. 13 and 15 of the drawings. The cover 175 of the upper casing portion 83, is provided, above the tripping member 168, with a pair of offset grooves 176 and 177, so arranged as to present tripping faces 178 and 179. Carried on the cam shaft 117 in a line with the tripping member 168, is a triple-lug member 180 having three tangential lugs 181, 182 and 183, corresponding respectively to first speed, second speed and third speed. Between the third speed and first speed lugs 183 and 181, there is a larger space than between the remaining lugs in order to account for reverse speed, which, as will later be seen can only be obtained by manual operation not under the automatic control of this embodiment of the present invention. Thus, when the frame 135 is moved forwardly by the depression of the clutch pedal 83a, the lug 170 of the tripping member 168 will come into contact with the tripping face 178 and cause the tripping member to be moved so that the depending lug 171 will be in the path of one of the lugs 181, 182 or 183. On the return of the frame, the depending lug 171 will engage the lug of the triple-lug member 180 then in its path, 181, 182 or 183, and move the same to rotate the cam shaft 117, thus manipulating the cams 123, 124, 125 and 126, to present a different flattened portion 123', 124', 125' or 126' upwardly, thus preparing the transmission for the next progressive shift.

Pivotally mounted on the shaft 152, respectively intermediate the plates 138 and 142, 143 and 147, 148 and 144 and 145 and 139, are locking members 184, 185, 186 and 187, having respectively locking faces 184', 185', 186' and 187', tripping faces, 184'', 185'', 186'' and 187'', and depending fork-block engaging tongues, 188, 189, 190 and 191. The tripping faces are normally in contact with tripping blocks 192 formed in the upper casing portion 183 and the locking faces are normally in contact respectively with similar faces 157'', 158'', 159'' and 160'' formed on the links 157, 158, 159 and 160.

The tongues 188, 189, 190 and 191 are respectively adapted to cooperate with walls 193, 194, 195 and 196 formed at the ends of grooves 193', 194', 195' and 196' in blocks 197, 198, 199 and 200, slideable on the base plate 201 of the upper casing portion 83. The outer blocks 197 and 200 are retained in position against movement by spring pressed balls 202 engaging in detents formed in the under surface of the blocks, and the inner blocks 198 and 199 are provided with oppositely disposed detents 198' and 199' in their fastened side edges with which there cooperates a pair of steel balls 203, the arrangement being such that when one of these blocks is moved and its detent is no longer in a line with the adjacent steel ball, the latter engages the detent in the other block and retains the same against movement. The inner blocks 198 and 199 are further provided with extensions 204 and 205 movable in slots 206 and 207, formed in the base plate 201 to which are respectively secured the forks 102 and 100.

The blocks 197 and 198 are respectively provided with facing racks 208 and 209, which engage therebetween a pinion 210 and the blocks 199 and 200 are respectively engaged with facing racks 211 and 212 having between them a pinion 213  Thus, if the block 197 is moved forwardly, the block 198 will move to the rear. This mechanism is the conventional transmission apparatus, and needs no further elucidation at this point.

The central finger 146 of the frame 135 is provided on its under surface, with a stop projection 214 adapted to normally contact a lug 215 formed on a cam member 216 pivoted on the shaft 152, to retain the cam against rotation while the frame moves forwardly. The engaging surface 216' of the cam 216 is adapted to depress a link 218 having the locking portion 219 so that the latter engages in transverse slots 220 and 221, formed in the central blocks 198 and 199 to lock the same together, thereby bringing about the shift of one of the blocks out of gear, when the other block is being moved into gear. This locking is only for a short time or until the gears in speed have been placed in neutral.

This is attained by releasing the locking portion 219 of the lug 218 from the slots 220 and 221 as soon as the gears are in neutral The link 218 is pivoted at 223 in the upper casing portion 83 and is normally retained in a raised position by a leaf spring 224, and after the cam 216 passes the raised portion 222, the spring 224 returns the link to its normal upper position. Upon the return movement of the frame 135, the cam 216 pivots so as to pass over the link 218 without affecting the same and is returned to its normal position by engaging a stop projection 225 formed in the upper casing portion 183.

This completes the description of the preferred form of the present invention, and while the operation thereof should be clearly understood from the foregoing, the same may be briefly summarized as follows:

Assuming that the motor vehicle equipped with the mechanism of the present invention is standing still, at which time the transmission gears are in neutral, the first step taken by the operator is to move the selector lever 62 which is normally pointing toward the "N" on the sector 64, toward the front-upper edge of the steering wheel, 57, until the indicating end 63 of the selector lever is pointing toward the numeral "1" which is indicative of first speed. This operation, through the shaft 58, gears 72 and 73, link 76, connecting rod 78, link 81, shaft 82, internally toothed sector 111, pinions 113 and 116, and shaft 117, moves the cams 123, 124, 125 and 126 until the flattened portion 125′ of the cam 125, which is the first speed cam, is facing upwardly. At that time the mechanism is in a position to cause the shifting of the gears into first speed upon the happening of the following. The operator now depresses the clutch pedal 83a, the first part of the movement of which operates the clutch to disconnect the motor shaft 93 from the transmission of the vehicle. Continued depression of the clutch pedal rotates the shaft 85 and moves the lever 127 and bar 130 forwardly, and the movement of these elements in turn, through the pivoted lever 133, moves the selector frame 135 forwardly in the upper casing portion 83 of the transmission 54. It will be noted that the links 157, 158, 159 and 160 are normally in a lowered position, resting respectively upon the locking members 184, 185, 186 and 187. As the frame 135 moves forwardly, the links will continue to remain in these positions until the rollers 157′, 158′, 159′ and 160′, reach the cams 123, 124, 125 and 126. As previously stated, the only cam whose flattened portion is facing upwardly, when the selector mechanism has been set for first speed, is the cam 125. Therefore, as the frame 135 continues to move forwardly, the rollers 157′, 158′ and 160′ of the links 157, 158 and 160, will come in contact with the cams 123, 124 and 126, so that the corresponding links will be raised from the locking members 184, 185, and 187, thus permitting these locking members to swing freely upon the shaft 152, so that the tongues 188, 189 and 191, will ride over the walls 193, 194 and 196 of the grooves 193′, 194′ and 196′, formed respectively in the sliding blocks 197, 198 and 200. As a result of this freedom of the tongues, the blocks 197 and 198 will remain stationary. It will be noted that the raising of the links 157, 158 and 160 will, through the binding with the collars 162, 163 and 165, rotate the shaft 149, in a counter-clock-wise direction. It will also be noted that in view of the fact that the selector cam 125 is positioned with its flattened portion 125′ fastened upwardly, the roller 159′ of the link 159, will not engage the cam 125, so that the engaging surface 159″ of the link 158, will remain in locking contact with the locking surface 186′ of the locking member 186, thus holding the tongue 190 against rotation. Therefore, the tongue 190 will engage the wall 195 of the groove 195′ formed in the slideable block 199, to move the same forwardly, thus causing the gear 99 to be moved into mesh with the smaller gear 107, which engagement positions the transmission in the first speed. The forward movement of the frame 135 brings about still another action. As the frame approaches the end of its forward movement, the lug 170 of the tripping member 168 engages the wall 178 of the slot 177 in the cover 175 of the upper casing portion 83. This engagement causes the tripping of the member 168 so that the depending lug 171 thereof will be in the path of the lug 181 of the triple-lug member 180. When the clutch pedal 83a is permitted to resume its normal upward position, the frame 135 will move back to its normal position in the rear of the transmission casing 54. This movement does several things, it causes the re-engagement of the clutch mechanism so that the motor vehicle may be driven in first speed. Continued movement of the frame 135 toward the rear of the transmission casing, causes the depending lug 171 of the tripping member 168 to engage the lug 181 of the triple lug member 180 to rotate the shaft 117 upon which the triple lug member 180 is fixed, thus manipulating the cams 123, 124, 125 and 126, so that the flattened portion 125′ of the lug 125 will no longer be facing upwardly, but instead, the flattened portion 123′ of the cam 123, will be facing upwardly, the latter cam corresponding to second speed. Hence, the selector mechanism will now be automatically positioned to shift the gears into second speed upon the happening of certain events which will be taken up shortly. As the frame 135 approaches the end of its rearward movement, the pawl 166 will engage the projection 167 to rotate the shaft 149 in a clock-wise direction. This rotation will cause the collars 162, 163 and 165 to bind with the links 157, 158 and 160, thus returning the latter to their normal lowered position in contact with the locking members 184, 185 and 187. Also, the tripping surfaces 184″, 185″ and 187″, will engage the projections 192 so as to cause the locking members 184, 185 and 187 to resume their normal positions. It will be noted that after the tripping member 168 has passed the triple-lug member 180, the lug 169 will come in contact with the tripping face 179 of the slot 176 to thus trip the member 168 to its normal position shown in Fig. 13 of the drawings.

As already stated, the motor vehicle will then be moving in first speed. All that is necessary to drive in second speed is to depress the clutch pedal 83a and thereafter permit it to rise to its normal position. The actions which occur when such manipulation is accomplished are as follows:

As before, depression of the clutch pedal 83a causes the dis-engagement of the clutch, hence disconnecting the motor shaft from the transmission shaft. Also, as before, the frame, 135, starts to move toward the front of the vehicle. During this movement, the links 158, 159 and 160 will, by reason of the engagement of the rollers 158′, 159′ and 160′ with the cams 124, 125 and 126, be raised to release the locking members 185, 186 and 187. However, in view of the fact that this time the cam 123 has its flattened portion 123′ facing upwardly, the roller 157′ of the link 157 will not engage said cam, thus locking the tongue 188 against rotation. It therefore follows that the locked tongue 188 will engage the wall 193 of the groove 193′ in the sliding block 197, to move said block forwardly. Just prior to the engagement of the locked tongue 188 with the wall 193, the cam 216 will depress the link 218 thus causing the locking portion 219 of the link to engage in the slots 220 and 221 formed in the blocks 198 and 199. These blocks will therefore be locked together. As a result, when the slideable block 197 moves forwardly, the racks 208 and 209 and the intervening pinion 210 will cause the block 198 to move rearwardly as shown in Fig. 23. The movement of the block 198 rearwardly causes a similar movement to be imparted to the block 199 which up to this time has been in a forward position corresponding to first speed. The blocks 197, 198, 199 and 200, will thus move together to move the gear 99 out of mesh with the gear 107 and back into a neutral position. As soon as the neutral position is reached, the cam 216 will have passed the raised portion 222 of the link 218. This will permit the link 218 to be raised by the spring 224 to free the locking portion 219 from the slots 220 and 221. The blocks 199 and 200 will therefore be left in a neutral position, although the continued movement of the frame 135 will cause the continued movement of the block 197 toward the front of the vehicle, and the block 198 toward the rear of the vehicle. The block 198 having attached to it the fork 102, the gear 101 will be moved rearwardly to mesh with the gear 106, at which time the transmission will be positioned in second speed. It now remains merely to release the clutch pedal 83a and the cams 123, 124, 125 and 126 will automatically be shifted for the next speed which will be high or third speed, and the vehicle will be traveling in second speed. Further manipulation of the clutch pedal 83a will bring about a complete cycle of operations just described to progressively and automatically shift the transmission as set forth in earlier portions of this specification.

This completes the description of the operation of the preferred embodiment of the automatic gear shifting mechanism of the present invention, and the advantages thereof, pointed out earlier in this description will be obvious to those skilled in the art to which the present invention relates.

I shall now describe a modified form of the gear shifting mechanism of the present invention, which modified embodiment is set forth in Figs. 27 to 34, inclusive.

In this embodiment the links 250, 251, 252 and 253, are slightly different from the links 157, 158, 159 and 160, of the preferred embodiment. The rear ends of these links are cut away at 250′, 251′, 252′ and 253′, to receive pins 254, 255, 256, and 257, which are fixed upon the shaft 149, the heads of these pins being adapted to engage the yoke portions 258, 259, 260 and 261 of the cut away portions 250′, 251′, and 253′. Thus, when any of the links are raised by the cooperation of the rollers 157′, 158′, 159′ and 160′ with the cams 123, 124, 125 and 126, the shaft 149 will be rotated although the link whose roller is not affected by the cams will remain in a lowered position. In order to assure the lowering of the raised links upon the return of the frame 135 to its normal rear position, the central short finger 146 of the frame 135 is provided with a tripping member 262 adapted to cooperate with the end wall 263 of a slot 264 in the cover 265 of the upper casing portion 83, and with a cooperating tripping member 265 fixed on the shaft 149, all as clearly shown in Figs. 33 and 34.

This embodiment also includes one other feature which is different from the corresponding feature in the preferred form, and this is the means for progressively shifting the cams 123, 124, 125 and 126 for the predetermined selection of speeds.

This embodiment includes no cam member 180 or tripping member 168, but instead the shaft 82 has fixed upon it a sector 266, the upper surface of which is provided with teeth 267, 268 and 269. Adapted to cooperate with these teeth, is a pawl 270 pivoted at 271 in a slide 272 connected with the lever 127, at 273, so that the slide will reciprocate simultaneously with the frame 135 when the clutch pedal 83a is operated. The pawl 270 is in contact with a leaf spring 274 which presses the rear end thereof downwardly, causing the front end, which carries a roller 275, to ride against the cover 175. The latter is provided with a depression 276, so that when the frame 135 and slide 272 start their return movement, after the release of the clutch pedal 83a, the roller 275 will ride in the depression 276 thereby causing the rear end of the pawl 270 to engage, for example, the teeth 269. Continued movement of the slide 272, operates the sector 266 to rotate the shaft 82 and through the associated mechanisms, the cams 123, 124, 125 and 126.

In the modification of the manually operated selector mechanism shown in Figs. 35 to 38 inclusive, the lever 62 is provided with a bore 300 in which operates a locking member 301, the forward latch portion 302 of which is adapted to cooperate with a plurality of locking pins 303, fixed upon the under surface of the sector 64, the locking member 301 being urged outwardly into the path of a plurality of locking pins 303 by the action of a spring 304 housed within the bore 300. The upper side of the bore 300 is open to present slot 305 through which extends the operating member 306 of the locking member 301, the arrangement being such that the lever 62 can be automatically moved in one direction only, that direction being the direction of a progressive selection of speeds, but being immovable in the opposite direction unless the operating member 306 of the locking member 301 is manipulated against the action of the spring 304 so that the latch portion 302 will clear the locking pins 303.

In the embodiment shown in Figs. 40 to 46 inclusive, there is just one change from the preferred embodiment. The selector wheel 350 instead of being provided with three relatively closely located lugs is provided with the lugs 351, 352 and 353, and one lug 354, which is equi-distantly spaced from the lugs 351 and 353, the lugs corresponding in the order mentioned to first speed, second speed, third speed and reverse, with the spaces between the lugs 350 and 354 and 353 and 354, designated by numerals 355 and 356, to neutral. Figs. 41 to 46 inclusive, show the various positions of the member 350, which is operated by the tripping member 168 when the member 350 is in its three forward speed positions, its two neutral positions, and its reverse position.

This completes the description of the modified form of the aforesaid illustrative embodiments of the present invention, and the advantages and superiorities thereof will readily occur to those skilled in the art to which the present invention relates.

What I claim as my invention is:

1. In combination with the operating member of a clutch and the slide blocks of a gear transmission, automatic shifting mechanism, comprising a sliding frame operable by the operating member of the clutch, a shaft rotatably mounted in said frame, a plurality of speed-selecting elements fixed upon said shaft, a plurality of gripping members cooperable with the slide blocks of the gear transmission, a plurality of locking members cooperable with said speed-selecting elements and said gripping members, means, operable by the depression of the clutch-operating member, actuating said sliding frame and the speed-selecting elements carried thereby to bring about cooperation between said speed-selecting elements and said locking members to positively lock a predetermined gripping member to engage a predetermined slide block of the transmission and shift the gears thereof, and means, operated by the return of the clutch-operating member to its normal position, actuating said sliding frame and the speed-selecting elements carried thereby to progressively operate the latter for the predetermined selection of the next speed of the transmission.

2. In combination with the operating member of a clutch and the slide blocks of a gear transmission, automatic shifting mechanism, comprising a sliding frame operable by the operating member of the clutch, a shaft rotatably mounted in said frame, a plurality of speed-selecting cams fixed upon said shaft, a plurality of gripping members cooperable with the slide blocks of the gear transmission, a plurality of locking members cooperable with said speed-selecting cams and said gripping members, means, operable by the depression of the clutch-operating member, actuating said sliding frame and the speed-selecting cams carried thereby to bring about cooperation between said speed-selecting cams and said locking members to positively lock a predetermined gripping member to engage a predetermined slide block of the transmission and shift the gears thereof, and means, operated by the return of the clutch-operating member to its normal position, actuating said sliding frame and the speed-selecting cams carried thereby to progressively operate the latter for the predetermined selection of the next speed of the transmission.

3. In combination with the operating member of a clutch and the slide blocks of a gear transmission, automatic shifting mechanism, comprising a sliding frame operable by the operating member of the clutch, a shaft rotatably mounted in said frame, a plurality of speed-selecting elements fixed upon said shaft, a plurality of gripping members cooperable with the slide blocks of the gear transmission, a plurality of locking links cooperable with said speed-selecting elements and said gripping members, means, operable by the depression of the clutch-operating member, actuating said sliding frame and the speed-selecting elements carried thereby to bring about cooperation between said speed-selecting elements and said locking links to positively lock a predetermined gripping member to engage a predetermined slide block of the transmission and shift the gears thereof, and means, operated by the return of the clutch-operating member to its normal position, actuating said sliding frame and the speed-selecting elements carried thereby to progressively operate the latter for the predetermined selection of the next speed of the transmission.

4. In combination with the operating member of a clutch and the slide blocks of a gear transmission, automatic shifting mechanism, comprising a sliding frame operable by the operating member of the clutch, a shaft rotatably mounted in said frame, a plurality of speed-selecting cams fixed upon said shaft, a plurality of gripping members cooperable with the slide blocks of the gear transmission, a plurality of locking links cooperable with said speed-selecting cams and said gripping members, means, operable by the depression of the clutch-operating member, actuating said sliding frame and the speed-selecting cams carried thereby to bring about cooperation between said speed-selecting cams and said locking links to positively lock a predetermined gripping member to engage a predetermined slide block of the transmission and shift the gears thereof, and means, operated by the return of the clutch-operating member to its normal position, actuating said sliding frame and the speed-selecting cams carried thereby to progressively operate the latter for the predetermined selection of the next speed of the transmission.

5. In combination with the operating member of a clutch and the slide blocks of a gear transmission, automatic shifting mechanism, comprising a sliding frame operable by the operating member of the clutch, a shaft rotatably mounted in said frame, a plurality of speed-selecting elements fixed upon said shaft, a plurality of latches cooperable with the slide blocks of the gear transmission, a plurality of locking members cooperable with said speed-selecting elements and said latches, means, operable by the depression of the clutch-operating member, actuating said sliding frame and the speed-selecting elements carried thereby to bring about cooperation between said speed-selecting elements and said locking members to positively lock a predetermined latch to engage a predetermined slide block of the transmission and shift the gears thereof, and means, operated by the return of the clutch-operating member to its normal position, actuating said sliding frame and the speed-selecting elements carried thereby to progressively operate the latter for the predetermined selection of the next speed of the transmission.

6. In combination with the operating member of a clutch and the slide blocks of a gear transmission, automatic shifting mechanism, comprising a sliding frame operable by the operating member of the clutch, a shaft rotatably mounted in said frame, a plurality of speed-selecting cams fixed upon said shaft, a plurality of latches cooperable with the slide blocks of the gear transmission, a plurality of locking members cooperable with said speed-selecting cams and said latches, means, operable by the depression of the clutch-operating member, actuating said sliding frame and the speed-selecting cams carried thereby to bring about cooperation between said speed-selecting cams and said locking members to positively lock a predetermined latch to engage a predetermined slide block of the transmission and shift the gears thereof, and means, operated by the return of the clutch-operating member to its normal position, actuating said sliding frame and the speed-selecting cams carried thereby to progressively operate the latter for the predetermined selection of the next speed of the transmission.

7. In combination with the operating member of a clutch and the slide blocks of a gear transmission, automatic shifting mechanism, comprising a sliding frame operable by the operating member of the clutch, a shaft rotatably mounted in said frame, a plurality of speed-selecting elements fixed upon said shaft, a plurality of latches cooperable with the slide blocks of the gear transmission, a plurality of locking links cooperable with said speed-selecting elements and said latches, means, operable by the depression of the clutch-operating member, actuating said sliding frame and the speed-selecting elements carried thereby to bring about cooperation between said speed-selecting elements and said locking links to positively lock a predetermined latch to engage a predetermined slide block of the transmission and shift the gears thereof, and means, operated by the return of the clutch-operating member to its normal position, actuating said sliding frame and the speed-selecting elements carried thereby to progressively operate the latter for the predetermined selection of the next speed of the transmission.

8. In combination with the operating member of a clutch and the slide blocks of a gear transmission, automatic shifting mechanism, comprising a sliding frame operable by the operating member of the clutch, a shaft rotatably mounted in said frame, a plurality of speed-selecting cams fixed upon said shaft, a plurality of latches cooperable with the slide blocks of the gear transmission, a plurality of locking links cooperable with said speed-selecting cams and said latches, means, operable by the depression of the clutch-operating member, actuating said sliding frame and the speed-selecting cams carried thereby to bring about cooperation between said speed-selecting cams and said locking links to positively lock a predetermined latch to engage a predetermined slide block of the transmission and shift the gears thereof, and means, operated by the return of the clutch-operating member to its normal position, actuating said sliding frame and the speed-selecting cams carried thereby to progressively operate the latter for the predetermined selection of the next speed of the transmission.

9. In combination with the operating member of a clutch and the slide blocks of a gear transmission, automatic shifting mechanism, comprising a sliding frame operable by the operating member of the clutch, a shaft rotatably mounted in said frame, a plurality of speed-selecting elements fixed upon said shaft, a plurality of gripping members cooperable with the slide blocks of the gear transmission, a plurality of locking members cooperable with said speed-selecting elements and said gripping members, means, operable by the depression of the clutch-operating member, actuating said sliding frame and the speed-selecting elements carried thereby to bring about cooperation between said speed-selecting elements and said locking members to positively lock a predetermined gripping member to engage a predetermined slide block of the transmission and shift the gears thereof, an automatic selector member fixed upon said shaft and associated with said speed-selecting elements, and means carried by said last-mentioned means and operated by the reciprocation of said sliding frame to operate said automatic selector member to manipulate said speed-selecting elements for the predetermined selection of the next speed of the transmission.

10. In combination with the operating member of a clutch and the slide blocks of a gear transmission, automatic shifting mechanism, comprising a sliding frame operable by the operating member of the clutch, a shaft rotatably mounted in said frame, a plurality of speed-selecting cams fixed upon said shaft, a plurality of gripping members cooperable with the slide blocks of the gear transmission, a plurality of locking members cooperable with said speed-selecting cams and said gripping members, means, operable by the depression of the clutch-operating member, actuating said sliding frame and the speed-selecting cams carried thereby to bring about cooperation between said speed-selecting cams and said locking members to positively lock a predetermined gripping member to engage a predetermined slide block of the transmission and shift the gears thereof, an automatic selector member fixed upon said shaft and associated with said speed-selecting cams, and means carried by said last-mentioned means and operated by the reciprocation of said sliding frame to operate said automatic selector member to manipulate said speed-selecting cams for the predetermined selection of the next speed of the transmission.

11. In combination with the operating member of a clutch and the slide blocks of a gear transmission, automatic shifting mechanism, comprising a sliding frame operable by the operating member of the clutch, a shaft rotatably mounted in said frame, a plurality of speed-selecting cams fixed upon said shaft, a plurality of gripping members cooperable with the slide blocks of the gear transmission, a plurality of locking links cooperable with said speed-selecting cams and said gripping members, means, operable by the depression of the clutch-operating member, actuating said sliding frame and the speed-selecting cams carried thereby to bring about cooperation between said speed-selecting cams and said locking links to positively lock a predetermined gripping member to engage a predetermined slide block of the transmission and shift the gears thereof, an automatic selector member fixed upon said shaft and associated with said speed-selecting cams, and means carried by said last-mentioned means and operated by the reciprocation of said sliding frame to operate said automatic selector member to manipulate said speed-selecting cams for the predetermined selection of the next speed of the transmission.

12. In combination with the operating member of a clutch and the slide blocks of a gear transmission, automatic shifting mechanism, comprising a sliding frame operable by the operating member of the clutch, a shaft rotatably mounted in said frame, a plurality of speed-selecting elements fixed upon said shaft, a plurality of latches cooperable with the slide blocks of the gear transmission, a plurality of locking members cooperable with said speed-selecting elements and said latches, means, operable by the depression of the clutch-operating member, actuating said sliding frame and the speed-selecting elements carried thereby to bring about cooperation between said speed-selecting elements and said locking members to positively lock a predetermined latch to engage a predetermined slide block of the transmission and shift the gears thereof, an automatic selector member fixed upon said shaft and associated with said speed-selecting elements, and means carried by said last-mentioned means and operated by the reciprocation of said sliding frame to operate said automatic selector member to manipulate said speed-selecting elements for the predetermined selection of the next speed of the transmission.

13. In combination with the operating member of a clutch and the slide blocks of a gear transmission, automatic shifting mechanism, comprising a sliding frame operable by the operating member of the clutch, a shaft rotatably mounted in said frame, a plurality of speed-selecting cams fixed upon said shaft, a plurality of latches cooperable with the slide blocks of the gear transmission, a plurality of locking members cooperable with said speed-selecting cams and said latches, means, operable by the depression of the clutch-operating member, actuating said sliding frame and the speed-selecting cams carried thereby to bring about cooperation between said speed-selecting cams and said locking members to positively lock a predetermined latch to engage a predetermined slide block of the transmission and shift the gears thereof, an automatic selector member fixed upon said shaft and associated with said speed-selecting cams, and means carried by said last-mentioned means and operated by the reciprocation of said sliding frame to operate said automatic selector member to manipulate said speed-selecting cams for the predetermined selection of the next speed of the transmission.

In testimony, whereof, I have signed my name to this specification this 14th day of April, 1931.

FELIX WILLIAM ZELCER.